US012746495B2

(12) United States Patent
Dworatzek et al.

(10) Patent No.: US 12,746,495 B2
(45) Date of Patent: Sep. 29, 2026

(54) SEPARATING DEVICE WITH A SEPARATING ELEMENT

(71) Applicant: MANN+HUMMEL GmbH, Ludwigsburg (DE)

(72) Inventors: Klemens Dworatzek, Edingen (DE); Pierre Jolin, Saint André (FR)

(73) Assignee: MANN+HUMMEL GmbH, Ludwigsburg (DE)

( * ) Notice: Subject to any disclaimer, the term of this patent is extended or adjusted under 35 U.S.C. 154(b) by 326 days.

(21) Appl. No.: 18/404,995

(22) Filed: Jan. 5, 2024

(65) Prior Publication Data

US 2024/0131461 A1 Apr. 25, 2024
US 2024/0226788 A9 Jul. 11, 2024

Related U.S. Application Data

(63) Continuation of application No. PCT/EP2022/065960, filed on Jun. 13, 2022.

(30) Foreign Application Priority Data

Jul. 5, 2021 (DE) ..................... 10 2021 117 297.7

(51) Int. Cl.
*B01D 46/00* (2022.01)
*B01D 46/24* (2006.01)

(52) U.S. Cl.
CPC ..... *B01D 46/0005* (2013.01); *B01D 46/0031* (2013.01); *B01D 46/2411* (2013.01);
(Continued)

(58) Field of Classification Search
CPC .............. B01D 46/003; B01D 46/0031; B01D 46/0005; B01D 46/0015; B01D 2271/022;
(Continued)

(56) References Cited

U.S. PATENT DOCUMENTS 4,632,682 A 12/1986 Erdmannsdorfer
6,006,924 A 12/1999 Sandford
(Continued)

FOREIGN PATENT DOCUMENTS

CN 207728465 U 8/2018
CN 209278042 U 8/2019
(Continued)

OTHER PUBLICATIONS

International Search Report in corresponding International Appln. No. PCT/EP2022/065960, Sep. 15, 2022, Rijswijk, Netherlands.
(Continued)

*Primary Examiner* — Robert Clemente

(57) ABSTRACT

A separation device for separating liquid from gas has a separation element with housing, housing cover with housing cover thread, and filter element arranged therein. A first gas passage arranged centrally relative to a mounting axis of the separation element at a connector device has the housing cover thread assigned thereto. A second gas passage is arranged radially outside the first gas passage. A connection element connecting the separation element to the connector device has a conduit and a connection element thread to which the housing cover thread is screwed. A circumferential element adjoining the connection element thread extends axially into the separation element. Connection element thread and circumferential element surround the conduit. A fluid channel extends axially between conduit and circumferential element. A contour element of the separation element and a counter contour element of the connection element interact confusion-proof when screwing the separation element onto the connection element.

19 Claims, 11 Drawing Sheets

(52) U.S. Cl.
CPC .. *B01D 2265/026* (2013.01); *B01D 2265/029* (2013.01); *B01D 2271/022* (2013.01)

(58) Field of Classification Search
CPC ........ B01D 2265/026; B01D 2265/029; B01D 2201/4046; B01D 46/2411
See application file for complete search history.

(56) References Cited

U.S. PATENT DOCUMENTS

| | | | |
|---|---|---|---|
| 10,035,092 | B2 | 7/2018 | Schmelzle et al. |
| 10,668,421 | B2 | 6/2020 | Zinic et al. |
| 11,679,353 | B2 | 6/2023 | Bartelt et al. |
| 2004/0163371 | A1 | 8/2004 | Reid |
| 2008/0237113 | A1 | 10/2008 | Jensen |
| 2010/0000412 | A1 | 1/2010 | Heikamp |
| 2015/0101293 | A1 | 4/2015 | Dworatzek et al. |
| 2018/0243676 | A1* | 8/2018 | Bartelt ............... B01D 46/2411 |
| 2018/0333670 | A1 | 11/2018 | Zinic et al. |
| 2021/0170314 | A1 | 6/2021 | Chavan et al. |
| 2022/0118395 | A1 | 4/2022 | Bartelt |

FOREIGN PATENT DOCUMENTS

| | | | |
|---|---|---|---|
| CN | 209510504 | U | 10/2019 |
| DE | 102016009487 | A1 | 2/2018 |
| DE | 202018000868 | U1 | 4/2018 |
| DE | 102019203799 | A1 | 9/2020 |
| WO | 15086376 | A1 | 6/2015 |
| WO | 18024469 | A1 | 2/2018 |
| WO | 19024991 | A1 | 2/2019 |

OTHER PUBLICATIONS

Office Action in corresponding Chinese Appln. No. 202280048183.7, 2026-005-20, 10 pages, China.

* cited by examiner

SEPARATING DEVICE WITH A SEPARATING ELEMENT

CROSS-REFERENCE TO RELATED APPLICATIONS

This application is a continuation application of international application No. PCT/EP2022/065960 having an international filing date of 13 Jun. 2022 and designating the United States, the international application claiming a priority date of 5 Jul. 2021 based on prior filed German patent application No. 10 2021 117 297.7, the entire contents of the aforesaid international application and the aforesaid German patent application being incorporated herein by reference.

BACKGROUND

The invention concerns a separation device for separating at least one liquid fluid from gas, in particular an aerosol formed of a liquid fluid from gas, in particular from air, of a connector device, in particular of a compressor, of a compressed air apparatus or of a vacuum pump, wherein the liquid fluid can be, for example, oil, fuel, hydraulic liquid or a cooling agent. The invention concerns furthermore a separation element for a separation device.

DE 10 2017 011 874 A1 discloses a separation device which serves for separation of at least one liquid from gas which is supplied from a connector device. Both the purified gas and the separated liquid are also returned again through the connector device. The separation device comprises at least one fluid discharge channel configured for discharging the separated liquid from the separation device, at least one connection element for connecting a separation element of the separation device to the connector device, which is also regularly referred to as connection nipple and in general, once mounted, remains at the connector device, as well as a separation element with a housing and at least one coalescence filter element arranged therein and a housing cover which is configured for closing an end face of the housing and is provided with at least one first gas passage which, in relation to a mounting axis of the separation element, is arranged centrally, in particular coaxially, at the connection device, as well as a second gas passage which, in relation to the mounting axis of the separation element, is arranged radially outside of the first gas passage.

The fastening thread of the separation device is seal-tight or fluid-impermeable. The liquid discharge is realized within the connection element, for example, by means of at least one annular discharge channel arranged inside the connection element. In order to prevent a liquid discharge through the housing cover, the housing cover is completely closed or completely seal-tight between the thread of the housing cover and the second gas passage of the housing cover.

SUMMARY

It is an object of the invention to provide a separation device for separation of at least one liquid fluid from gas which enables a beneficial discharge of the separated liquid fluid.

A further object is to provide a separation element for such a separation device which enables a beneficial mounting in the separation device.

The aforementioned object is solved according to an aspect of the invention by a separation device for separation of at least one liquid fluid from gas, comprising at least one separation element with a housing with a housing cover and a filter element arranged therein, wherein the housing cover comprises a housing cover thread configured for screwing onto a connection element thread, at least one first gas passage which, in relation to a mounting axis of the separation element at a connector device, is arranged centrally, in particular coaxially, and to which the housing cover thread is assigned, at least one second gas passage which, in relation to the mounting axis of the separation element, is arranged radially outside of the first gas passage, at least one connection element configured for connecting the separation element of the separation device to the connector device and comprising a connection element thread as well as a conduit, wherein a circumferential element adjoins the connection element thread and extends in axial direction into an interior of the separation element, wherein the connection element thread as well as the circumferential element surround the conduit, and wherein at least one fluid channel extending in an axial direction is formed between conduit and circumferential element. The separation element comprises at least one contour element and the connection element comprises at least one complementary counter contour element which, upon intended screwing of the separation element onto the connection element, are configured for confusion-proof interaction, in particular configured for engaging each other.

The further object according to a further aspect of the invention is solved by a separation element for a separation device according to one of the preceding claims, with a housing and at least one filter element arranged therein and with a housing cover configured for closing an end face of the housing and provided with at least one first gas passage which, in relation to an intended mounting axis of the separation element at a connector device, is arranged centrally, in particular coaxially, a housing cover thread assigned to the first gas passage which, upon intended mounting, is configured for screwing onto a connection element thread of a connection element of the separation device, and at least one second gas passage which, in relation to the intended mounting axis of the separation element, is arranged radially outside of the first gas passage, wherein the filter element comprises an end face which, in relation to the intended mounting axis of the separation element, extends radially and faces the housing cover and is delimited by a first end disk, wherein the end disk comprises an extension opening configured for passing the connection element therethrough and assigned to the first gas passage, wherein the separation element comprises at least one contour element which, upon intended screwing of the separation element onto the connection element, is configured for accommodating a counter contour element arranged at the connection element of the separation device, and the contour element comprises at least one contour which can be assembled confusion-proof with the counter contour element.

An inner diameter of the extension opening is larger than an outer diameter of the connection element at that location. Between a radially outer circumferential wall of the connection element and a radially inner rim region of the extension opening, an annular coaxial gap remains through which the separated liquid fluid can pass into the fluid channel.

Beneficial embodiments and advantages of the invention result from the additional claims, the description, and the drawing.

According to an aspect of the invention, a separation device for separation of at least one liquid fluid from gas is proposed, comprising at least one separation element with a housing with a housing cover and a filter element arranged therein, wherein the housing cover comprises a housing cover thread configured for screwing onto a connection element thread, at least one first gas passage which, in relation to a mounting axis of the separation element at a connector device, is arranged centrally, in particular coaxially, and to which the housing cover thread is assigned, at least one second gas passage which, in relation to the mounting axis of the separation element, is arranged radially outside of the first gas passage, at least one connection element configured for connecting the separation element of the separation device to the connector device and comprising a connection element thread as well as a conduit, wherein a circumferential element adjoins the connection element thread and extends in axial direction into an interior of the separation element, wherein the connection element thread as well as the circumferential element surround the conduit, and wherein at least one fluid channel extending in an axial direction is formed between conduit and circumferential element.

The separation element comprises at least one contour element and the connection element comprises at least one complementary counter contour element which, upon intended screwing of the separation element onto the connection element, are configured for confusion-proof interaction.

The separation device serves for separation of at least one liquid fluid from gas, in particular of an aerosol formed of liquid fluid from gas, in particular from air, wherein the liquid fluid can be, for example, oil, fuel, hydraulic liquid or cooling agent. The gas is supplied from a connector device, in particular of a compressor, of a compressed air apparatus or of a vacuum pump. The purified gas and the separated liquid fluid are also discharged again through the connector device.

The separation device comprises at least one fluid channel configured for discharging the separated liquid from the separation device, at least one connection element configured for connecting a separation element of the separation device to the connector device, a separation element with a housing and at least one filter element arranged therein and a housing cover configured for closing an end face of the housing.

The housing cover comprises at least one first gas passage which, in relation to a mounting axis of the separation element at the connector device, is arranged centrally, in particular coaxially, a thread assigned to the first gas passage, wherein this housing cover thread is configured for screwing to a thread of the connection element, and at least one second gas passage which, in relation to the mounting axis of the separation element, is arranged radially outside of the first gas passage.

When using identical connector threads, the invention advantageously permits or prevents screwing on in a targeted manner. Thus, the compatibility or incompatibility of components can be made available in a targeted fashion.

In the filter element, for example, a plurality of layers, wound so as to lie on each other, of a coalescence filter medium, for example, of a glass fiber paper, can be arranged in which small liquid droplets are joined to larger drops and are drained downwardly toward the liquid outlet by force of gravity.

The transport of the separated liquid fluid can be realized optionally also by an appropriate differential pressure. This is beneficial, e.g., in case of Asuspended arrangement@ of the separator. In this context, the transport of the separated liquid fluid can be realized by means of an additional tube.

The connection element is usually fixedly connected, for example, by a screw connection and/or adhesive connection, to the connector device which, for example, is arranged at a compressor. For intended use, the separation element is screwed onto the connection element and is connected in this way gas-tightly and liquid-tightly to the connector device. Such separation elements are therefore generally known as Aspin-on separators@.

The fastening thread of the separation device, which is formed of the housing cover thread and of the connection element thread, is configured for this purpose seal-tightly or fluid-impermeably, in particular substantially liquid-impermeably. The fastening thread and the housing cover thread for this purpose are preferably continuous, i.e., the threads comprise a plurality of complete and continuous thread turns. The housing cover can be connected seal-tightly to the connection element without additional seal element in the present invention because the thread of the housing cover is configured in particular in this manner for sealing or for seal-tight engagement in the thread of the connection element, i.e., is seal-tightly connectable to the thread of the connection element. A liquid drainage through the fastening thread of the separation device is reliably prevented.

Thus, the separated liquid must drain radially within the fastening thread of the separation device, namely within the connection element arranged in the first gas passage. In the separation element of the present invention, the fluid discharge channel is thus arranged, in relation to the mounting axis of the separation element, radially inside of the housing cover thread or radially inside of the connection element thread. Thus, the liquid drainage is realized within the connection element, for example, by at least one annular fluid channel which is arranged within the connection element.

The fluid channel extends between conduit and circumferential element in an axial direction. Depending on the length of the circumferential element surrounding the conduit, it may be necessary that the fluid level in the filter element must surpass first a certain level before the liquid fluid can drain via the fluid channel.

Advantageously, the separation device according to the invention comprises therefore a connection element in which the circumferential element comprises one or a plurality of passages which pass through the circumferential element in radial direction from its outer side up to the fluid channel. These passages which, for example, can be configured as bores from an outer side of the circumferential element radially inwardly up to the fluid channel make it possible that the liquid fluid can flow into the fluid channel and drain already at a minimal fluid level. Especially for a circumferential element of a relatively long design, the separated liquid fluid can thus beneficially drain already at a low fluid level.

According to a beneficial embodiment of the separation device, the circumferential element can comprise the counter contour element with one or a plurality of passages which pass through the circumferential element in radial direction from its outer side up to the fluid channel.

Due to the high economical benefit, service friendliness, and simple integration, separation devices furnished with spin-on separators are used more and more. This increases the need for differentiation of individual products, for example, products with different separation properties but otherwise practically identically constructed. Required is here a reliable prevention of mounting of separation elements on connection elements of separation devices. In addition, products of different performance, exchange intervals or the like should however be compatible, or not compatible, as intended. For the differentiation, there has been up to now only the possibility of varying the threads whereby the task can be fulfilled however only to a limited extent. It is possible in a targeted fashion to enable or prevent screwing on when using identical connector threads.

Due to the arrangement of a contour element at the separation element which, upon mounting of the separation element on the connection element, interacts with a counter contour element arranged at the connection element according to a Alock-and-key@ principle, it can be effected that only a separation element provided for this purpose can be mounted at the connection element. In this way, it can be ensured that only approved combinations of separation element and connection element are used.

As a whole, the separation device enables in this manner the customized compatibility demanded by the market in order to enable or prevent the exchangeability of individual products, for example, with different separation properties.

According to a beneficial embodiment of the separation device, the contour element can be configured as a radially inner, in particular circular, rim region of an extension opening in a first end disk of the filter element and the circumferential element can comprise the counter contour element, wherein the counter contour element passes through the contour element upon intended mounting of the separation element at the connection element, and wherein in particular an outer diameter of the counter contour element is smaller than an inner diameter of the contour element.

The circumferential element can be extended, for example, to the interior of the separation element. Preferably, here the diameter of the thread base is used and provided with additional passages as a connection to fluid channels. This extension can be dimensionally matched such that it hits the rim region of the separation element when placing the separation element of a separation device not intended for this onto the connection element, and screwing on is prevented in this way. Only dimensionally matched separation elements whose rim region provides the suitable opening region can thus be mounted.

According to a beneficial embodiment of the separation device, the contour element can comprise at least one contour, in particular cutouts and/or cuts and/or holes, which interact with at least one counter contour arranged at the counter contour element upon intended mounting, in particular engage each other. In this context, a counter contour is immersed in the corresponding cutouts and/or cuts and/or holes and enables thus screwing on of the separation element with simultaneous engagement of contour and counter contour.

An additional counter contour in the region of the connection element thread in the interior of separation elements effects in combination with a matchingly shaped contour of the separation element a type of Alock-and-key@ system. For producing additional variants of contour element and counter contour element, the extension of the circumferential element can be provided additionally with a counter contour matching, in a type of mutual locking action, cutouts and holes of the contour at the separation element. This contour is immersed in the corresponding cutouts, cuts or holes and enables thus the screwing on of the separation element.

According to a beneficial embodiment of the separation device, the passages can be arranged inside of the counter contour in circumferential direction of the connection element. These passages which, for example, can be embodied as grooves from an outer side of the circumferential element radially inwardly up to the fluid channel enable that the liquid fluid can flow into the fluid channel and drain already at a minimal fluid level. Especially for circumferential elements configured to be relatively long, the separated liquid fluid can thus beneficially drain already at a low fluid level.

According to a beneficial embodiment of the separation device, at least one of contour element and counter contour element can be rotatably supported about the mounting axis. Since the separation element is screwed with a thread onto the connection element, a rotatable support of at least one of the two additional components is required when the contour element and the counter contour element engage each other in a type of mutual locking action upon mounting of the separation element on the connection element.

According to a beneficial embodiment of the separation device, at least one sealing and damping element can be fluid-tightly compressed between the filter element and a seal surface, configured at the inner side of the housing cover which is facing the interior of the housing, for sealing a clean side of the separation element from a raw side of the housing holding unpurified gas and for damping axially oriented vibrations of the filter element in relation to the mounting axis of the separation element.

Instead of providing the sealing action between separation element and the connection element by means of an O-ring seal, for example, the sealing action between a raw side and a clean side of the separation device is realized according to the invention by a seal between an end disk of the filter element and the housing cover. The installation space in the rim region of the end disk of the filter element of the separation element now available by omitting the O-ring seal can serve for accommodating an additional component which takes on the function of the contour element. For this purpose, the contour element can be provided advantageously with cutouts, cuts or holes as contour and can be rotatably supported.

According to a beneficial embodiment of the separation device, the connection element and the first end disk, in particular the connection element and the extension opening, in particular the connection element and the rim region, can be contactless in position of use of the separation device in such a way that housing cover thread and interior of the filter element are in throttled fluid communication.

In an advantageous embodiment of the separation device of the present invention, the connection element in the region of the extension opening is arranged such in relation to the filter element that the distance between the radially outer circumferential wall of the connection element in relation to the mounting axis of the separation element and the radially inner rim region of the first end disk amounts to at most 3 mm, preferably less than 2 mm, and particularly preferred less than 1 mm, in order to reduce a liquid drainage through the extension opening. This spacing can also be referred to as width of the gap which is formed there. In this way, a throttle action is produced locally and the fluid flow and gas exchange between the connection element and the separation element is thus minimized.

According to a further aspect of the invention, a separation element for a separation device is proposed, with a housing and at least one filter element arranged therein and with a housing cover configured for closing an end face of the housing and provided with at least one first gas passage which, in relation to an intended mounting axis of the separation element at a connector device, is arranged centrally, in particular coaxially, a housing cover thread assigned to the first gas passage which, upon intended mounting, is configured for screwing onto a connection element thread of a connection element of the separation device, and at least one second gas passage, which, in relation to the intended mounting axis of the separation element, is arranged radially outside of the first gas passage. In this context, the filter element comprises an end face, which, in relation to the intended mounting axis of the separation element, extends radially and faces the housing cover and is delimited by a first end disk. The end disk comprises an extension opening configured for passing the connection element therethrough and assigned to the first gas passage. The separation element comprises in this context at least one contour element which, upon intended screwing of the separation element onto the connection element, is configured, for example, for accommodating a counter contour element arranged at the connection element of the separation device. In particular, the contour element comprises at least one contour which can be assembled confusion-proof with the counter contour element.

Due to the arrangement of a contour element at the separation element which, upon mounting of the separation element on the connection element, interacts with a counter contour element arranged at the connection element in accordance with a Alock-and-key@ principle, it can be effected that only a separation element which is provided for this purpose can be mounted at the connection element of a separation device. In this way, it can be ensured that only approved combinations of separation element and connection element can be used.

The housing cover comprises at least one first gas passage which, in relation to a mounting axis of the separation element at the connector device, is arranged centrally, in particular coaxially, a thread assigned to the first gas passage, wherein this housing cover thread is configured for screwing onto a thread of the connection element, and at least one second gas passage which, in relation to the mounting axis of the separation element, is arranged radially outside of the first gas passage.

In the filter element, for example, a plurality of layers, wound so as to lie on each other, of a coalescence filter medium, for example, of a glass fiber paper, can be arranged in which small liquid droplets are joined to larger drops and are drained downwardly toward the liquid outlet by force of gravity.

According to a beneficial embodiment of the separation element, the counter contour element can pass at least in sections through the contour element upon intended mounting of the separation element on the connection element.

The contour element, for example, can be configured as a radially inner rim region of the end disk of the filter element of the separation element. The counter contour element of the connection element can be arranged, for example, at the circumferential element of the connection element or can be embodied as such. The circumferential element can be extended, for example, in the direction of the interior of the separation element. Preferably, here the diameter of the thread base is used. This extension can be matched dimensionally such that the latter, upon placing the separation element onto the connection element of a separation device, not designed appropriately, will hit the rim region of the separation element and, in this way, screwing on is prevented. Only dimensionally matched separation elements whose rim region provides the suitable opening region can thus be mounted because the counter contour element can engage, or pass through, a central opening of the rim region of the end disk of the filter element.

According to a beneficial embodiment of the separation element, the extension opening can be delimited by a radially inner rim region of the first end disk in relation to the intended mounting axis of the separation element, wherein the contour element can be configured as a radially inner, in particular circular, rim region of the extension opening and the circumferential element can comprise the counter contour element. In this context, an outer diameter of the counter contour element can be smaller than an inner diameter of the contour element.

The contour element, for example, can be embodied as a radially inner rim region of the end disk of the filter element of the separation element. The counter contour element of the connection element can be arranged, for example, at the circumferential element of the connection element or can be embodied as such. The circumferential element, for example, can be extended to the interior of the separation element. Preferably, here the diameter of the thread base is used. This extension can be matched dimensionally such that the latter, upon placing the separation element onto the connection element of the separation device, not designed appropriately, will impact on the rim region of the separation element and screwing on is thus prevented. Only separation elements which are dimensionally matched and whose rim region provides the suitable opening region can thus be mounted because the counter contour element can engage, or pass through, a central opening of the rim region of the end disk of the filter element.

According to a beneficial embodiment of the separation element, the contour element can comprise in particular cutouts and/or cuts and/or holes as at least one contour. Advantageously, the contour upon intended mounting can interact, in particular interlock, with at least one counter contour provided at the counter contour element.

An additional counter contour in the region of the connection element thread in the interior of the separation element effects in combination with a matchingly shaped contour of the separation element a type of Alock-and-key@ system. For producing additional variants, the extension of the circumferential element can be provided additionally with a counter contour matching, in a type of mutual locking action, cutouts, cuts and holes of the contour at the separation element. This contour is immersed into the corresponding cutouts, cuts or holes and enables thus the screwing on of the separation element.

According to a beneficial embodiment of the separation element, at least one of contour element and counter contour element can be supported so as to be rotatable about the mounting axis. Since the separation element is screwed with a thread onto the connection element, a rotatable support of at least one of the two additional components arranged as contour element and counter contour element is required when the contour element and the counter contour element during mounting of the separation element on the connection element engage each other in a type of mutual locking action.

According to a beneficial embodiment of the separation element, at least one receptacle for a sealing and damping element can be provided which is seal-tightly compressed between the filter element, in particular between the first end disk, and a seal surface embodied at an inner side of the housing cover facing the interior of the housing. In this context, the sealing and damping element can be configured to seal a clean side of the separation element from a raw side of the housing holding unpurified gas and to dampen axially oriented vibrations of the filter element in relation to the intended mounting axis of the separation element.

The sealing and damping element, for example, can be seal-tightly compressed coaxially in relation to the mounting axis of the separation element between the first end disk, in particular between at least one projection extending axially in the direction toward the housing cover, for example, between at least one vertical web or at least one annular groove, of the first end disk, and the housing cover.

As an alternative to an axial compression of the sealing and damping element, the sealing and damping element can also be compressed radially in relation to the mounting axis of the separation element between the first end disk, in particular between at least one projection extending axially in direction toward the housing cover, for example, between at least one vertical web or at least one annular groove, of the first end disk, and the housing cover.

Advantageously, the sealing and damping element is axially compressed such between the first end disk and the housing cover that the sealing and damping element can withstand the pressure between raw side and clean side.

The axial or coaxial extension or height or thickness of the sealing and damping element in relation to the mounting axis of the separation element amounts advantageously to at least one millimeter, in particular at least two millimeters, for example, at least three millimeters.

The sealing and damping element is advantageously formed of at least one material which comprises a temperature resistance of above 100 degrees Celsius as well as a long term oil resistance, in particular an oil resistance according to DIN EN 60811-2-1.

The sealing and damping element is thus advantageously of a material with simultaneous high thermal resistance and high chemical resistance, in particular high oil resistance. For example, the sealing and damping element can be comprised substantially of at least one fluoroelastomer, for example, of fluoro-rubber (FKM), for example, of FKM with 60-80 Shore A, or of fluorocarbon rubber and/or of at least one rubber material, for example, of at least one peroxide-crosslinked rubber, for example, of hydrogenated acrylonitrile butadiene rubber (HNBR).

BRIEF DESCRIPTION OF DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
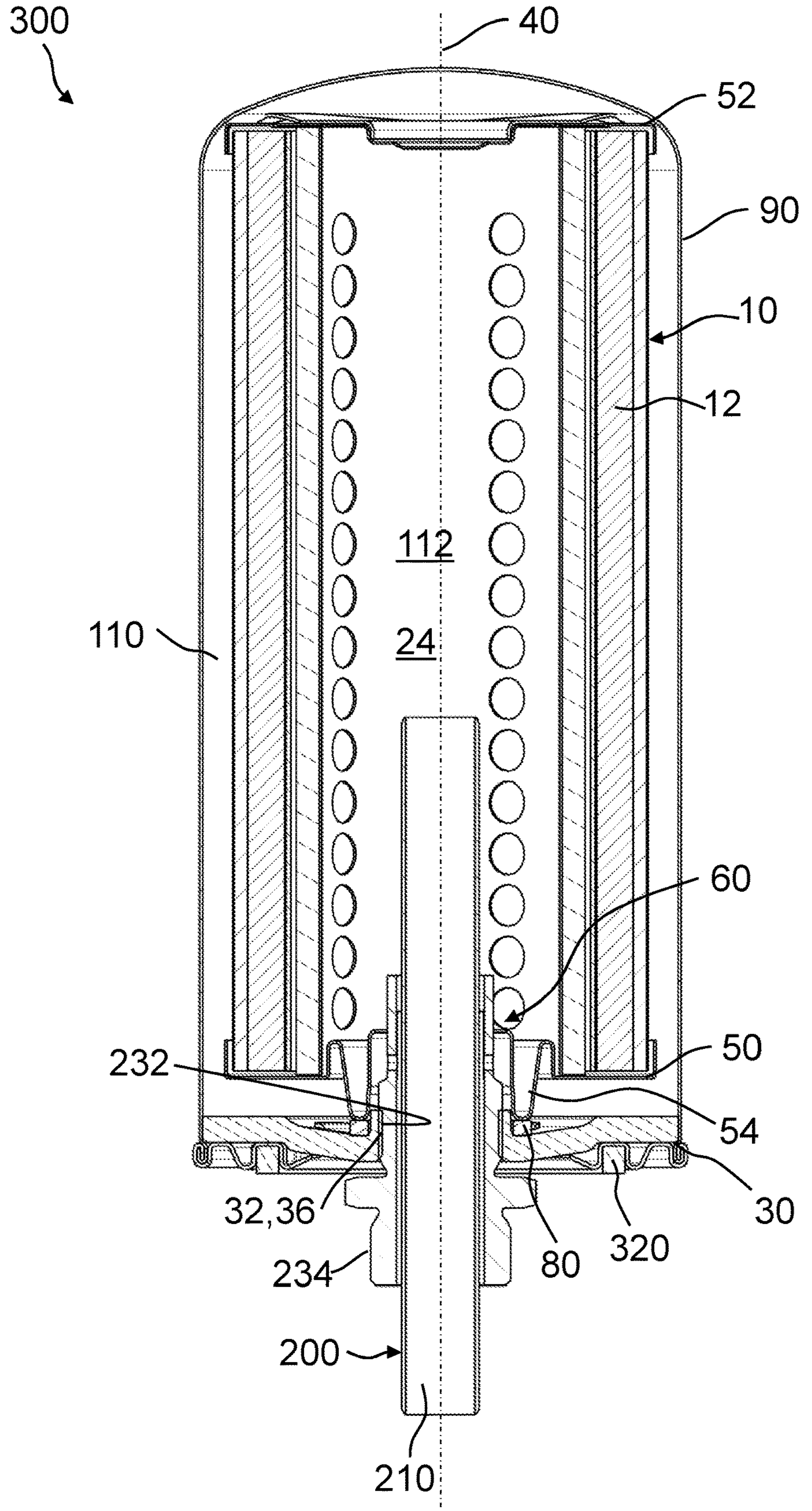
FIG. 1 shows a longitudinal section through a separation device according to an embodiment of the invention.

In the Figures, same or same-type components are identified with same reference characters. The Figures show only examples and are not to be understood as limiting.

Figure 2:
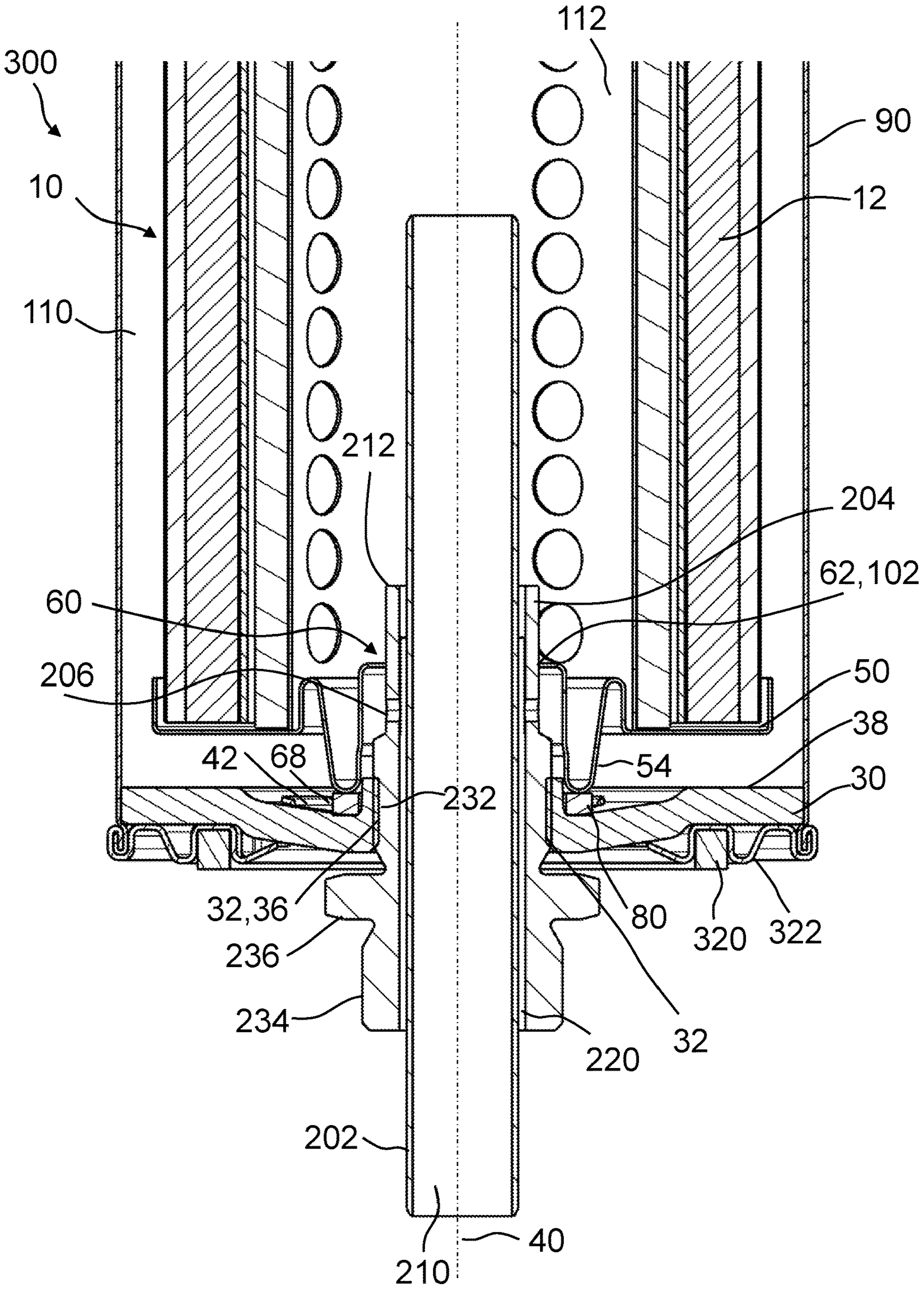
FIG. 2 shows an enlarged detail of the region of the connection element of the separation device according to FIG. 1.
Figure 3:
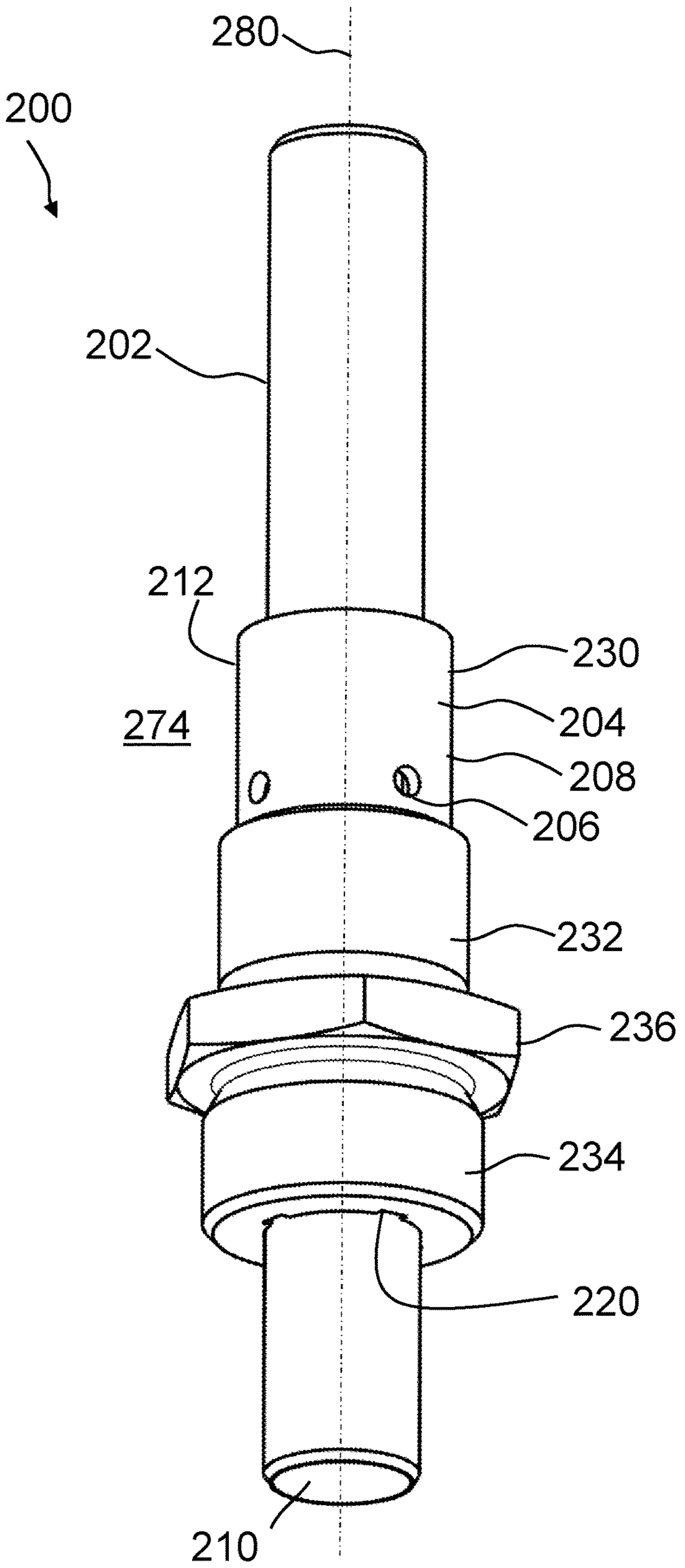
FIG. 3 shows an isometric illustration of the connection element of the separation device according to an embodiment of the invention.

FIG. 1 shows a longitudinal section through a separation device 300 according to an embodiment of the invention, while in FIG. 2 an enlarged detail of the region of the connection element 200 of the separation device 300 according to FIG. 1 is illustrated. FIG. 3 shows an isometric illustration of the connection element 200.

The separation device 300 serves for separation of at least one fluid from gas, in particular of aerosol formed of liquid fluid from gas. The liquid fluid can be, for example, oil, fuel, hydraulic liquid, or cooling agent. The gas can be in particular air of a connector device 400 (illustrated in FIG. 8), in particular of a compressor, of a compressed air apparatus or of a vacuum pump.

The separation device 300 comprises a separation element 100 with housing 90 with housing cover 30 and a filter element 10 arranged therein. The housing cover 30 comprises a housing cover thread 36 which is configured for screwing onto a connection element thread 232 of a connection element 200.

The separation device 300 comprises furthermore a first gas passage 32 which, in relation to a mounting axis 40 of the separation element 100 at a connector device 400, is arranged centrally, in particular coaxially, and to which the housing cover thread 36 is assigned.

The separation device 300 comprises furthermore a second gas passage 34 (not visible in FIG. 1) which, in relation to the mounting axis 40 of the separation element 100, is arranged radially outside of the first gas passage 32.

The separation device 300 comprises furthermore a connection element 200 which is configured for connecting the separation element 100 of the separation device 300 to the connector device 400 and which comprises a connection element thread 232 as well as a conduit 202. A circumferential element 204 adjoins the connection element thread 232 and extends in axial direction 40 into an interior 24 of the separation element 100. The connection element thread 232 as well as the circumferential element 204 surround the conduit 202. At least one fluid channel 220 extending in axial direction 280 is formed between conduit 202 and circumferential element 204.

The circumferential element 204 comprises one or a plurality of passages 206 which pass through the circumferential element 206 in radial direction from an outer side 274 up to the fluid channel 220.

Between the filter element 10 and a seal surface 42 formed at an inner side of the housing cover 30 facing the interior of the housing 90, the separation element 100 comprises a sealing and damping element 80 for sealing a clean side 112 of the separation element 100 from a raw side 110 of the housing 90 holding unpurified gas and for damping axially oriented vibrations of the filter element 10 in relation to the mounting axis 40 of the separation element 100. The sealing and damping element 80 can be designed as an O-ring which is seal-tightly compressed. Instead of an O-ring, also a flat seal or a shaped seal can be used as sealing and damping element.

The connection element 200 and the first end disk 50, in particular the connection element 200 and the extension opening 60, in particular the connection element 200 and the radially inner rim region 62 of an extension opening 60 of the end disk 50 of the filter element 10, are configured contactless in the position of use of the separation device 300 in such a way that housing cover thread 36 and interior of the filter element 10 are in throttled fluid communication.

The separation element 100 comprises at least one contour element 102 which, upon intended screwing of the separation element 100 onto the connection element 200, is configured for confusion-proof interaction with the counter contour element 212 arranged at the connection element 200.

Due to the arrangement of a contour element 102 at the separation element 100 which interacts upon mounting of the separation element 100 on the connection element 200 with a counter contour element 212 arranged at the connection element 200 in accordance with a Alock-and-key@ principle, it can be effected that only a separation element 100 which is provided for this purpose can be mounted at the connection element 200. In this way, it can be ensured that only approved combinations of separation element 100 and connection element 200 can be used.

The contour element 102 can advantageously be configured as a radially inner, in particular circular, rim region 62 of an extension opening 60 in a first end disk 50 of the filter element 10, while the circumferential element 204 can comprise the counter contour element 212. In this context, the counter contour element 212, upon intended mounting of the separation element 100 on the connection element 200, can pass through the contour element 102, wherein in particular an outer diameter of the counter contour element 212 can be smaller than an inner diameter of the contour element 102.

The circumferential element 204 can be extended, for example, toward the interior 24 of the separation element 100. Preferably, here the diameter of the thread base is used and provided with additional passages 206 as connection to fluid channels 220. This extension can be dimensionally matched such that, upon placement of a separation element 100, not designed appropriately, on the connection element 200, it hits the rim region 62 of the separation element 100 and, in this way, screwing on is prevented. Only dimensionally matched separation elements 100 whose rim region 62 provides the suitable opening region can thus be mounted.

The counter contour element 212 which is embodied as an extended circumferential element 204 can be seen in particular in FIG. 3 in the isometric illustration of the connection element 200.

The circumferential element 204 surrounds the conduit 202 which, with a hollow tubular interior 210, realizes the connection to the first gas passage 32 of the separation element 100. Between conduit 202 and circumferential element 204, a plurality of drain channels 220 are formed which, by means of passages 206 configured as radially extending bores, are in communication with the outer side 274 of the connection element 200 and enable drainage of the separated liquid fluid. Below the circumferential element 204, the connection element thread 232 surrounds the conduit 202. Arranged adjoined thereto are a hexagon element 236 with a following thread 234 for connection to a connector device 400 (see FIG. 8).

The fluid channel 220 extends between conduit 202 and circumferential element 204 in an axial direction 280. Depending on the length of the circumferential element 204 surrounding the conduit 202, it may be necessary that the fluid level in the filter element 10 must first surpass a certain level until the liquid fluid can drain via the fluid channel 220.

Therefore, the separation device 300 according to the invention comprises advantageously a connection element 200 in which the circumferential element 204 comprises one or a plurality of passages 206 which pass through the circumferential element 204 in radial direction from its outer side 208 up to the fluid channel 220. These passages 206, which, for example, can be embodied as bores radially inwardly from the outer side 208 of the circumferential element 204 up to the fluid channel 220, make it possible that the liquid fluid already at a minimal fluid level can flow into the fluid channel 220 and drain. Especially for circumferential elements 200 which are embodied to be relatively long, the separated liquid fluid can thus beneficially drain already at low fluid level.

Figure 4:
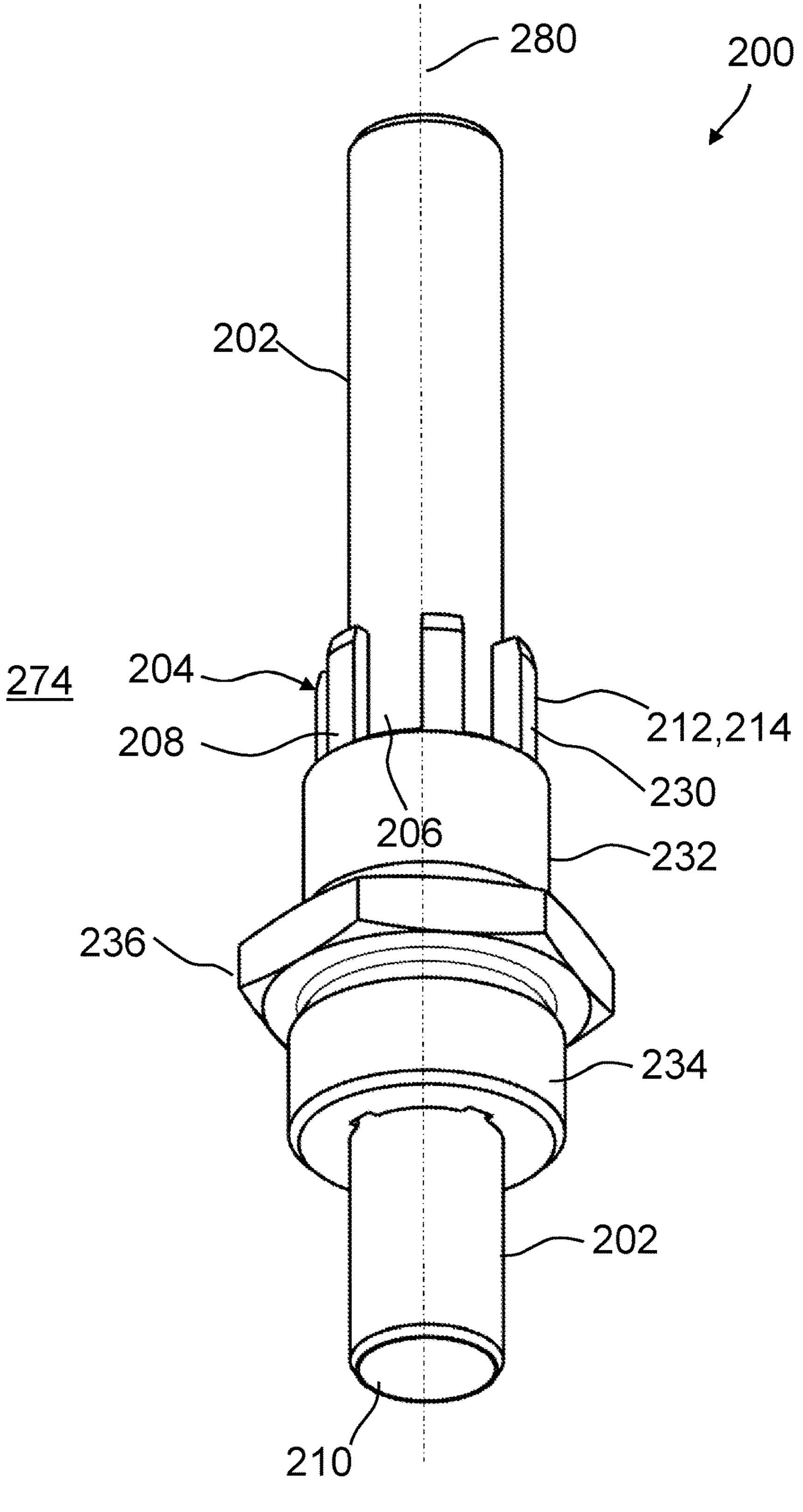
FIG. 4 shows an isometric illustration of the connection element of the separation device according to a further embodiment of the invention.
Figure 5:
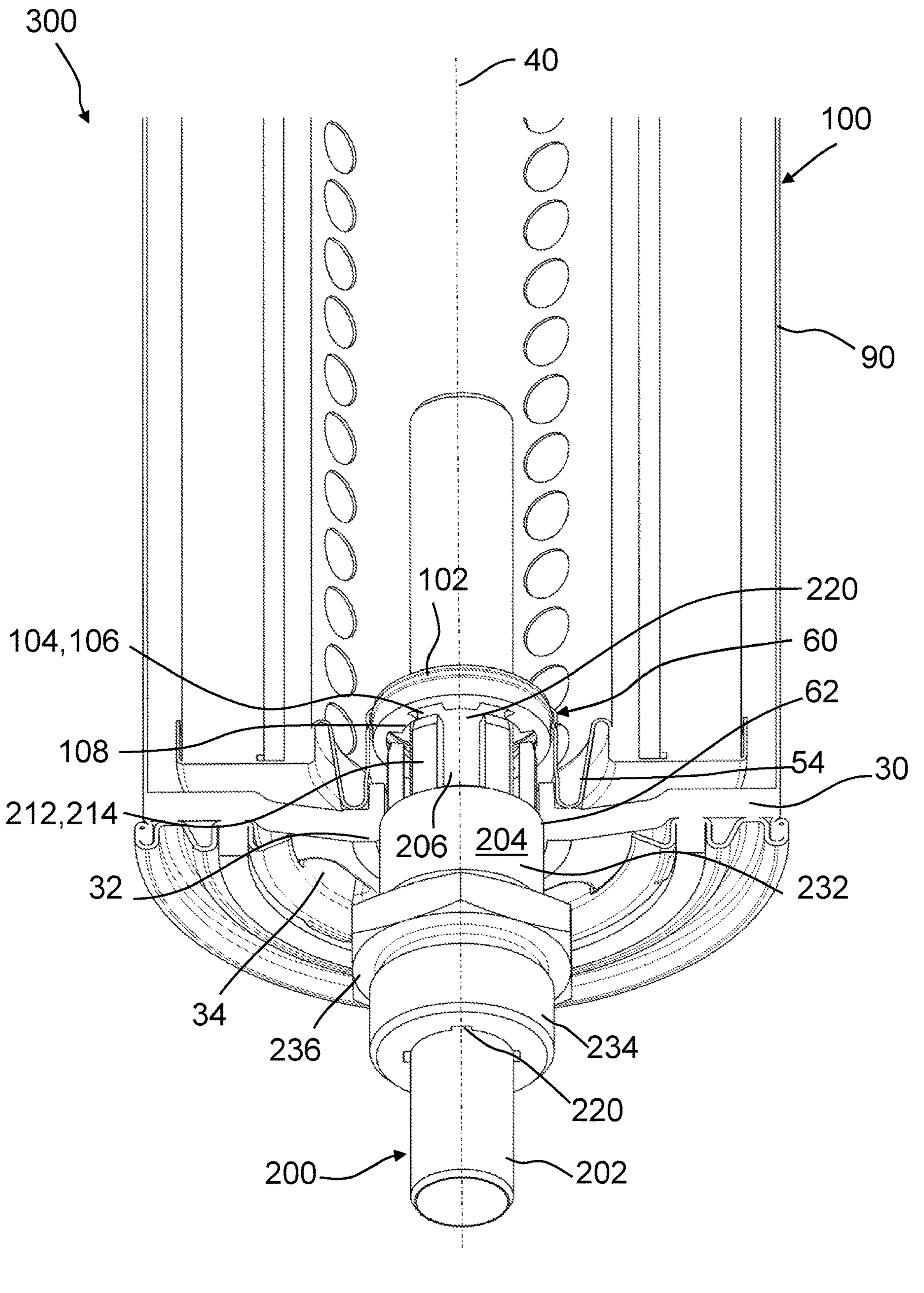
FIG. 5 shows an isometric view of the separation device according to an embodiment of the invention in an exploded view.

FIG. 4 shows an isometric illustration of a connection element 200 of the separation device 300 according to a further embodiment of the invention, while in FIG. 5 an isometric view of a separation device 300 with such a connection element 200 is illustrated in an exploded illustration. In this context, the separation element 100 has not yet been screwed completely onto the connection element 200.

In this separation device 300, the contour element 102 of the separation element 100 comprises a contour 104, in particular cutouts 106 or cuts, which upon intended mounting interacts, in particular interlocks, with a counter contour 214 arranged at the counter contour element 212 of the connection element 200.

An additional counter contour 214 in the region of the connection element thread 232 in the interior of the separation element 100 effects in combination with matchingly shaped contour 104 of the separation element 100 a type of Alock-and-key@ system. For generating additional variants, the extension of the circumferential element 204 can be provided additionally with a counter contour 214 matching, in a type of mutual locking action, cutouts 106, cuts or holes of the contour 104 at the separation element 100. This counter contour 214 is immersed in the corresponding cutouts 106, cuts or holes and enables thus the screwing on of the separation element 100 while contour 104 and counter contour 214 engage each other at the same time.

As an alternative, the contour 104 can also be of a two-part configuration. A first part of the contour 104 can be a simple rotatably supported disk with the lock-and-key contour. The second part can advantageously serve as a captive safety for the first part and hold the first part in position.

Upon placement of the separation element 100 on the connection element 200, the counter contour 214 can engage the cutouts 106 which are arranged between projections 108 in the rim region 62 so that the separation element 100 can be screwed on the connection element 200 in a confusion-proof manner. For this purpose, the rim region 62 can be expediently rotatably supported in the end disk 50 of the filter element 10 about the mounting axis 40. Alternatively, also the counter contour element 212 can be rotatably supported about the mounting axis 40.

The passages 206 in circumferential direction of the connection element 200 as fluidic connection to the drain channels 220 are arranged in this embodiment inside of the counter contour 214.

Figure 6:
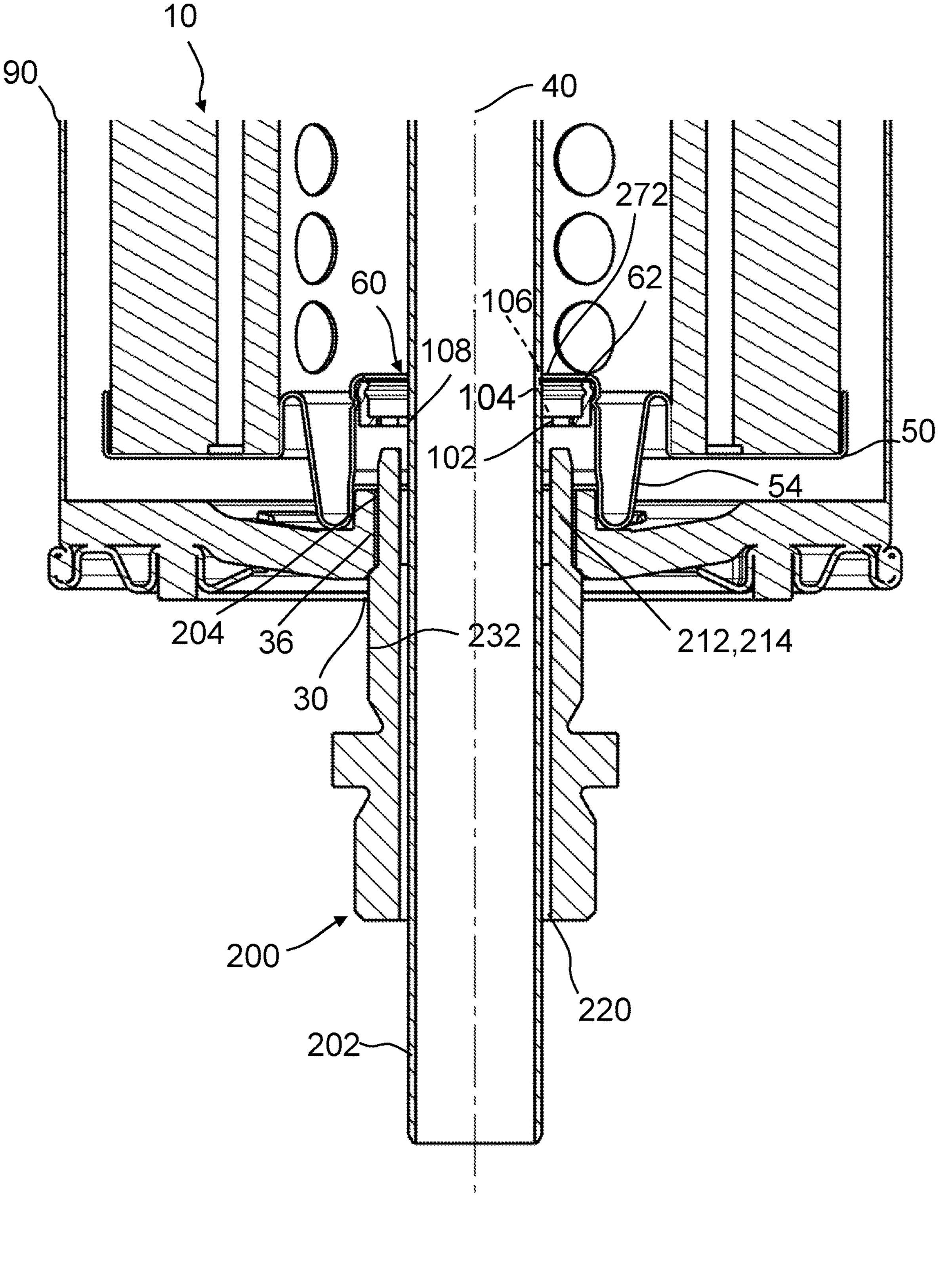
FIG. 6 shows an enlarged detail of the region of the contour element and counter contour element of the separation device according to a further embodiment of the invention in a section illustration.

FIG. 6 shows an enlarged detail of the region of the contour element 102 and counter contour element 212 of the separation device 300 according to a further embodiment of the invention in a section illustration. The separation element 100 has not yet been completely screwed on the connection element 200 but only placed on the connection element 200. In this embodiment, the counter contour 214 of the counter contour element 212 engages the contour 104 which is formed as cutouts 106 (not visible in section) between projections 108 of the contour element 102. The rim region 62 of the extension opening 60 of the end disk 50 adjoins directly the outer circumference of the counter contour element 212. The end disk 50 passes via an annular depression 54 into the inner rim region 62. The annular depression 54 can fulfill the function of a fluid storage space 66 for the separated liquid fluid. When the fluid level of the separated fluid surpasses a certain level, the liquid fluid can flow into the fluid channel 220 and drain.

Figure 7:
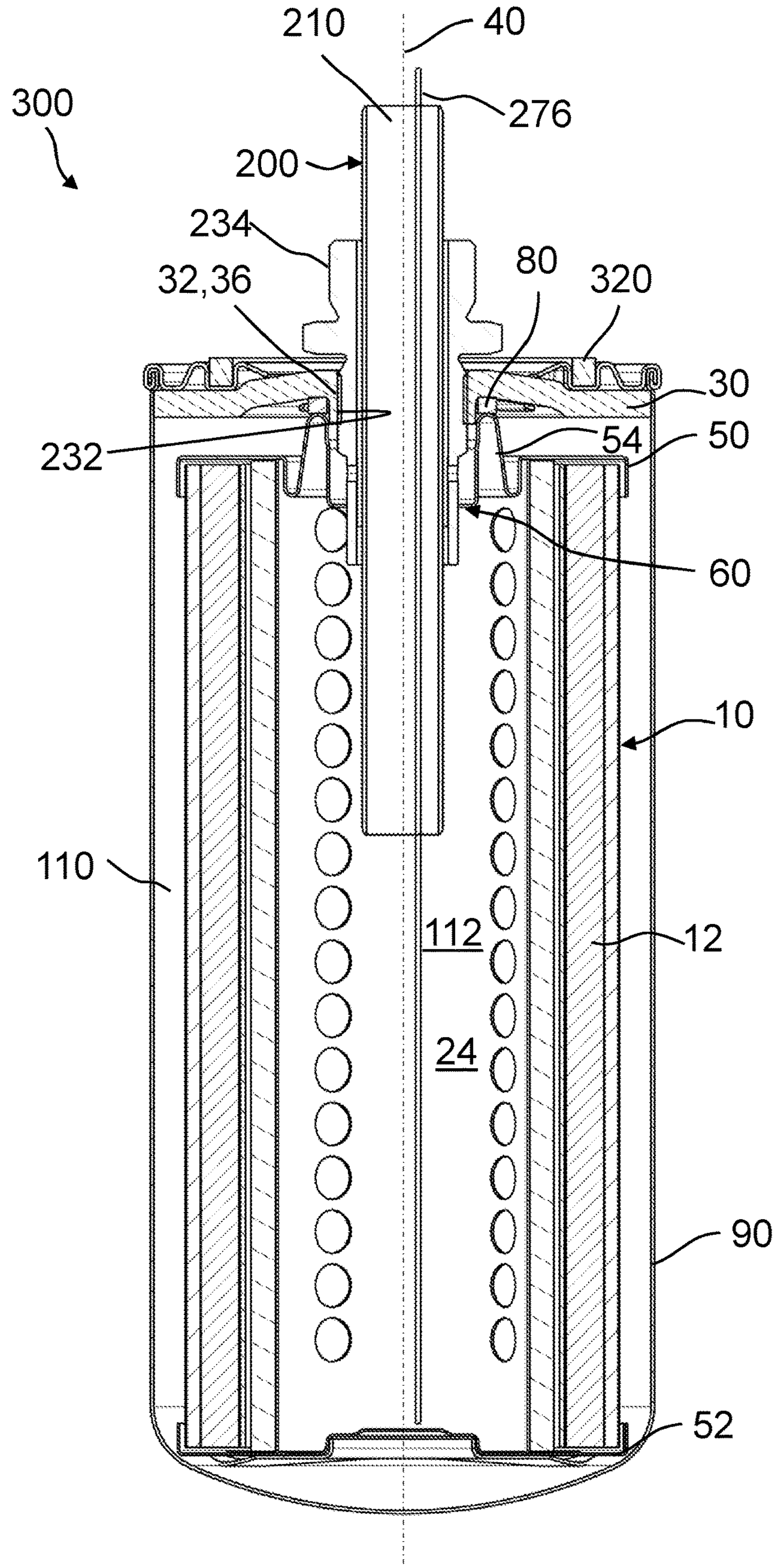
FIG. 7 shows a longitudinal section through a separation device according to a further embodiment of the invention in intended suspended arrangement.

In FIG. 7, a longitudinal section through a separation device 300 according to a further embodiment of the invention is illustrated in an intended suspended arrangement. Due to the force of gravity, the separated liquid fluid does not collect in this arrangement in the region of the first end disk 50 but at the oppositely positioned end of the second end disk 52 of the filter element 10. In order to discharge the separated liquid fluid, a suction tube 276 is therefore arranged in the interior 210 of the connection element 200 through which the liquid fluid can be sucked away.

Figure 8:
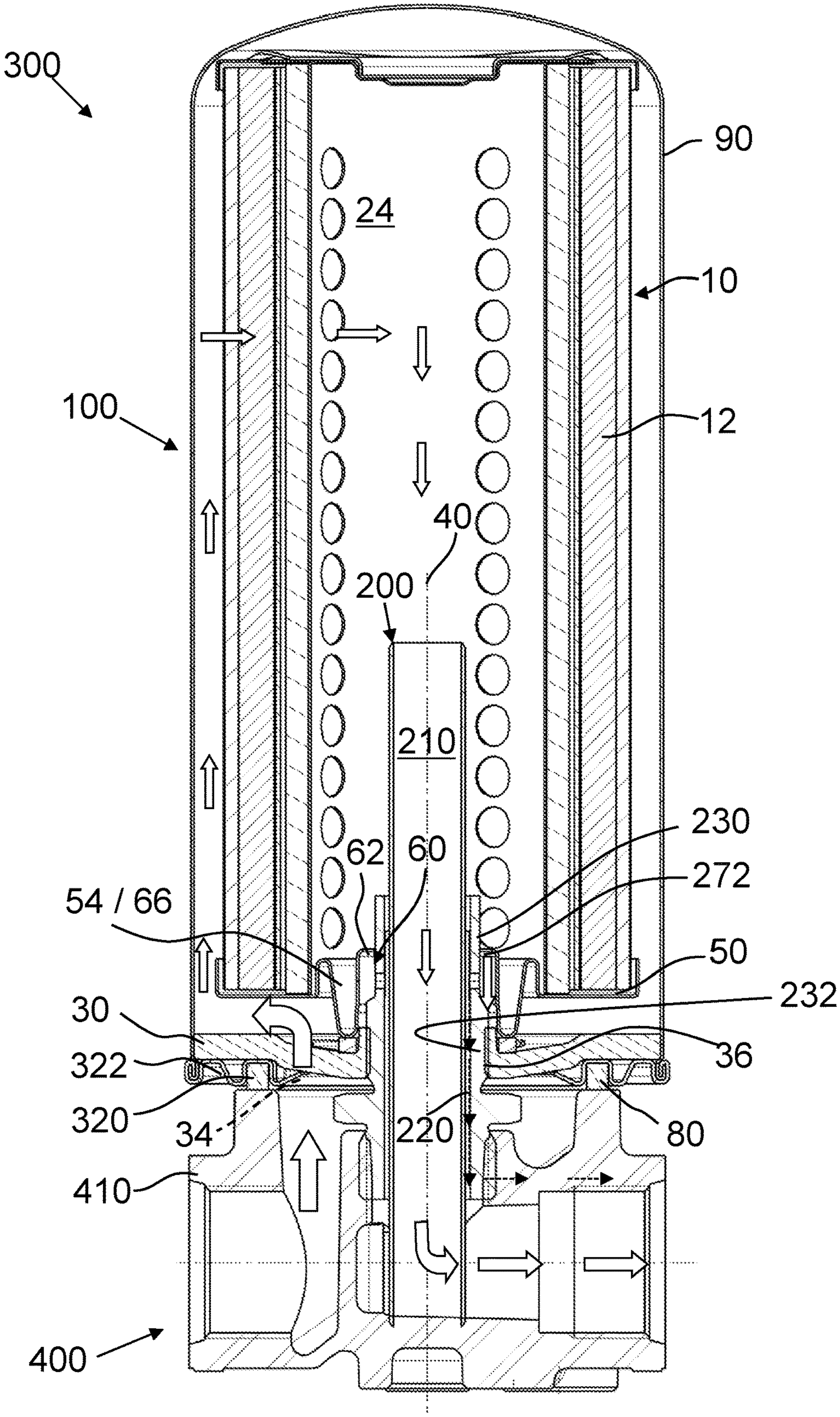
FIG. 8 shows a longitudinal section through a separation device mounted at a connector device according to an embodiment of the invention.

FIG. 8 shows a longitudinal section through a separation device 300 according to an embodiment of the invention mounted on a connector device 400.

The separation element 100 is exchangeably fastened at a connector head 410 of the connector device 400, in FIG. 8 at the bottom. The connector head 410 serves as a connector device for corresponding air conduits and oil conduits for connection to the corresponding apparatus, for example, a compressor, a compressed air apparatus or a vacuum pump. In FIG. 8, the connector head 410 is only schematically illustrated.

A connection element 200, namely a hollow tubular socket-type connection nipple, connects the separation element 100 to the connector head 410. For discharging the purified gas from the separation device 300, the connection element 200 surrounds a conduit 202 with a gas-conducting interior 210.

The separation element 100 comprises a cup-shaped housing 90. In the housing 90, a filter element 10 embodied as an annular coalescence element is arranged as an example. As filter medium 12, the filter element 10 can comprise as an example a glass fiber mat which is wound multiple times in a ring shape and, at the end faces, is delimited by a second end disk 52 and a first end disk 50 facing the connector head 410. A nonwoven can be arranged in the interior of the glass fiber winding as further filter medium.

The opening of the housing 90 which is facing the connector device 400 is closed by a housing cover 30. The separation element 100 is sealed in relation to the connector head 410 by a seal 320 which is arranged in a seal holder 322 at the housing cover 30.

The conduit 202 projects into the interior 24 of the filter element 10 and extends through a central first gas passage 32 as gas outlet of the housing cover 30 to a connector head 410 arranged outside of the separation element 100 and configured for connecting the connection element 200 to the connector device 400.

For supplying the gas to be purified, the housing cover 30 comprises a second gas passage 34 which, in relation to the mounting axis 40 of the separation device 300, is arranged radially outside of the first gas passage 32. This second gas passage 34 is assigned to the raw side 110 of the separation element 100.

For discharging the separated liquid fluid from the separation element 100, the connection element 200 comprises a fluid channel 220 extending from the interior of the separation element 100 to the connector head 410 of the connection element 200. This fluid channel 220 is arranged within the connection element 200, namely between the tubular conduit 202 and the circumferential element 204 of the connection element 200 radially surrounding the conduit 202.

The flow path of the gas in the separation device 300 is illustrated in FIG. 8 by means of block arrows. Raw gas flows into the housing 90 through the second gas passage 34 as gas inlet, passes laterally at the filter element 10 upwardly, and flows through it from the exterior to the interior. The liquid fluid which is separated in the filter element 10 collects in an annular depression 54 of the first end disk 50 to a defined level, then flows into the fluid channel 220 between conduit 202 and a region of the connection element 200 surrounding the conduit 202 and is then discharged. The flow path of the liquid fluid in the separation device 300 is illustrated in FIG. 8 by means of dashed line arrows.

In general, the separation device 300 is arranged operation-ready in the orientation which is illustrated in FIG. 1 or FIG. 8. However, it can also be arranged in other orientations. When in the following reference is being had to bottom, top or the like, this relates to the illustration in FIGS. 1 and 8, if nothing to the contrary is mentioned.

The housing 90, the filter element 10, and the connection element 200 each are coaxial to a virtual mounting axis 40 in the operation-ready mounted separation device 300. The separation element 100 can be screwed by means of the connection element 200 onto the connector head 410 and unscrewed therefrom about the mounting axis 40.

When in the following radial, axial, coaxial or circumferential or the like is mentioned, this relates to the mounting axis 40, if nothing to the contrary is mentioned.

The first end disk 50 which is facing the housing cover 30 is approximately ring-shaped. It comprises a coaxial mounting opening or extension opening 60 for the connection element 200. Radially between the extension opening 60 and the filter medium 12 of the filter element 10, the first end disk 50 is bent multiple times so that a circumferential annular depression 54 open toward the element interior 24 of the filter element 10 results.

A radially inner rim region 62 of the first end disk 50 surrounds the extension opening 60. It is oriented toward the connection element 200 which is arranged in the extension opening 60. In order to facilitate mounting of the separation element 100, the radially inner rim region 62 of the first end disk 50 can be configured for support at the connection element 200. In the advantageous embodiments illustrated in FIGS. 1 through 10, the radially extending inner rim region 62 or the inner rim region 62 extending in the direction toward the connection element 200 serves for supporting the first end disk 50 at the outer circumferential side 230 of the connection element 200. This is beneficial when during mounting of the separation element 100 the housing cover

30 is guided along the outer circumferential side 230 or the circumferential element 204 of the connection element 200 until the thread 36 of the housing cover 30 comes into contact with the thread 232 of the connection element 200.

An inner diameter of the extension opening 60 is larger than an outer diameter of the connection element 200 there. An annular coaxial gap 272 remains between the radially outer circumferential wall 230 or the circumferential element 204 of the connection element 200 and the radially inner rim region 62 of the extension opening 60.

Figure 9:
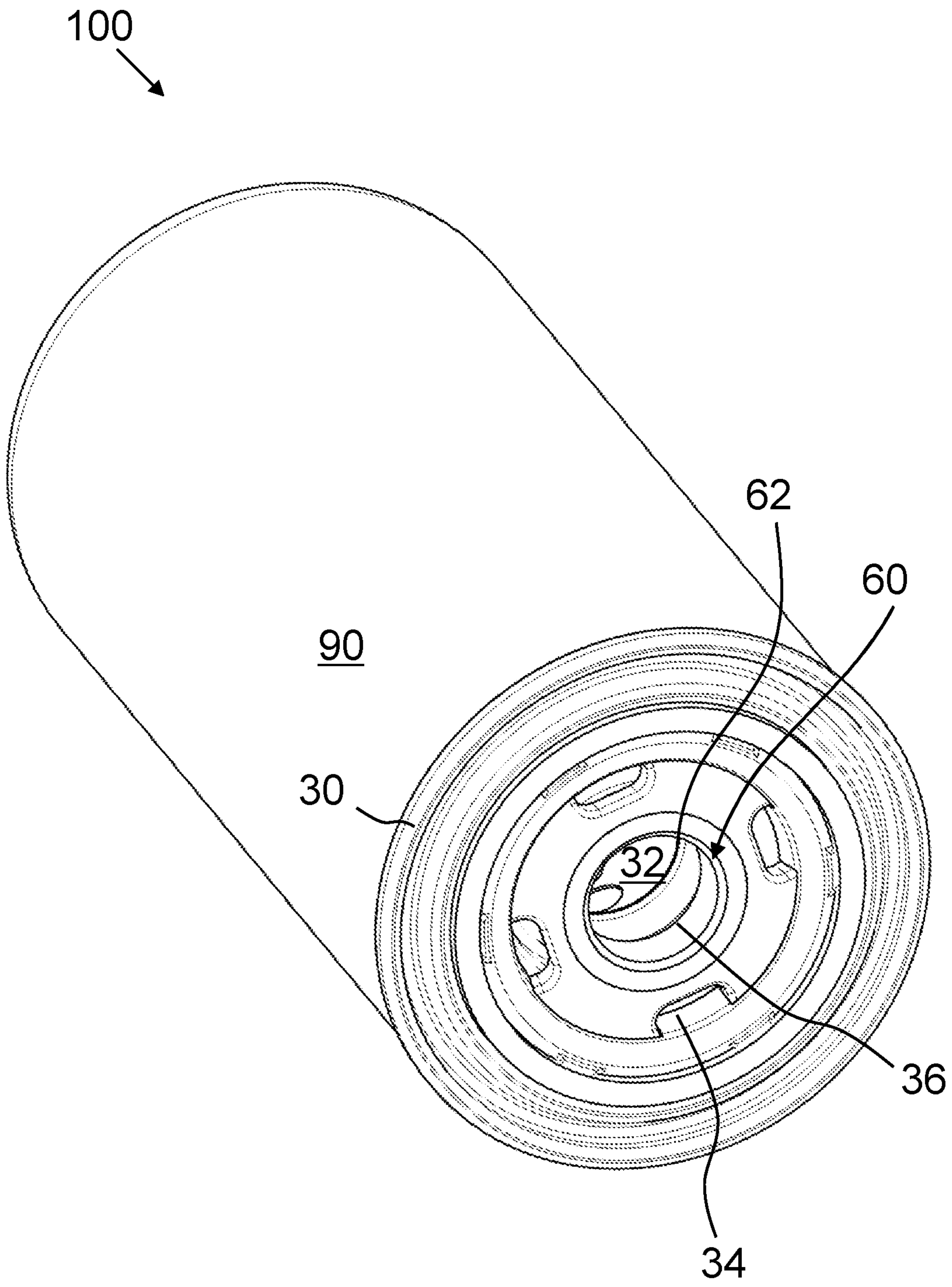
FIG. 9 shows an isometric view of a separation element according to an embodiment of the invention.
Figure 10:
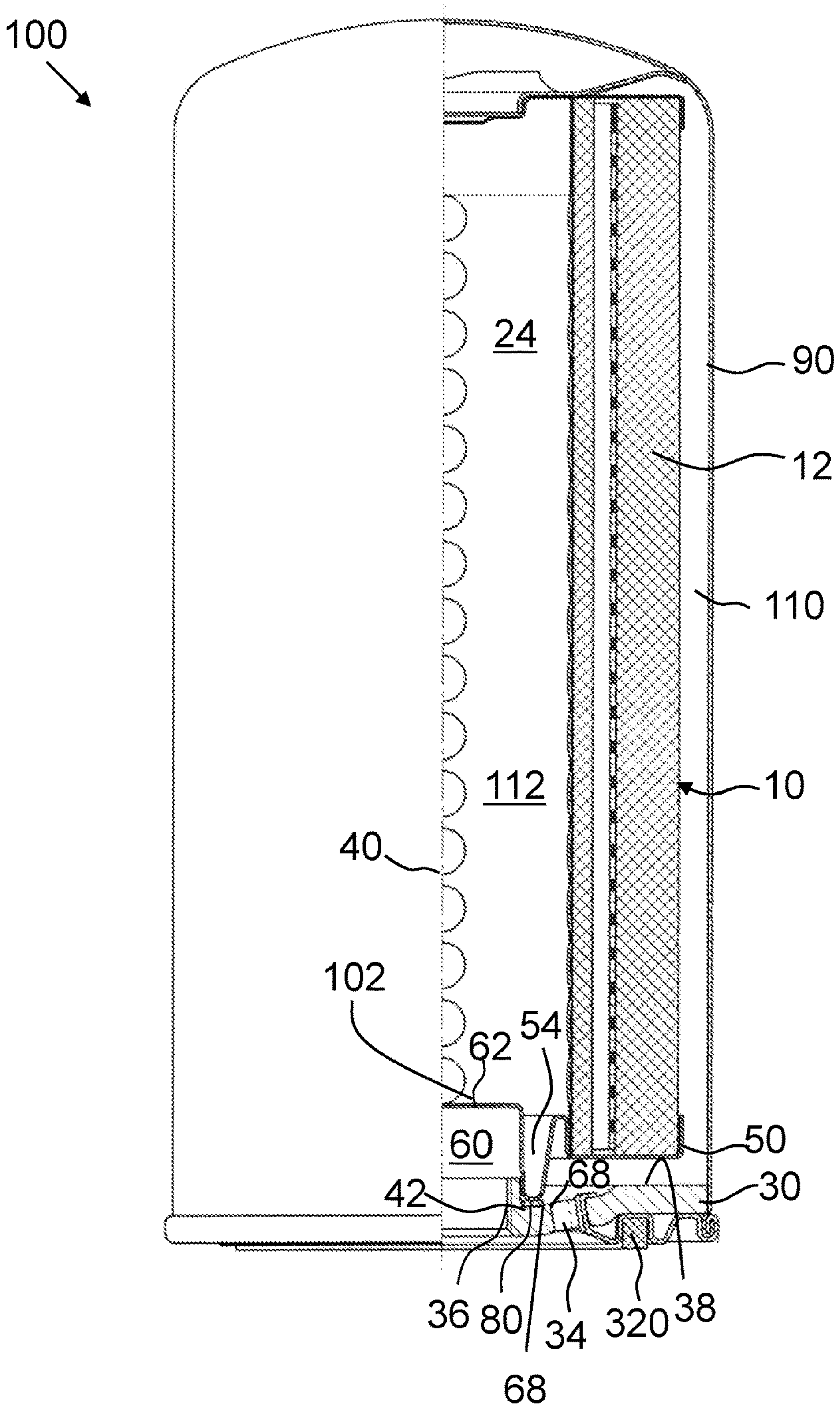
FIG. 10 shows a longitudinal section through the separation element according to FIG. 9.

FIG. 9 shows an isometric view of a separation element 100 according to an embodiment of the invention while in FIG. 10 a longitudinal section through the separation element 100 according to FIG. 9 is illustrated.

The separation element 100 for a separation device 300 as illustrated in FIGS. 1 through 8 comprises a housing 90 and at least one filter element 10 arranged therein as well as a housing cover 30 configured for closing an end face of the housing 90.

The housing cover 30 comprises a first gas passage 32 which, in relation to an intended mounting axis 40 of the separation element 100 at the connector device 400, is arranged centrally, in particular coaxially, and a housing cover thread 36 which is assigned to the first gas passage 32 and which is configured upon intended mounting for screwing onto a connection element thread 232 of a connection element 200 of the separation device 300.

Furthermore, the housing cover 30 comprises at least one second gas passage 34 which, in relation to the intended mounting axis 40 of the separation element 100, is arranged radially outside of the first gas passage 32.

The filter element 10 comprises an end face which, in relation to the intended mounting axis 40 of the separation element 100, extends radially and is facing the housing cover 30 and which is delimited by a first end disk 50. In this context, the end disk 50 comprises an extension opening 60 configured for passing the connection element 200 therethrough and assigned to the first gas passage 32.

The separation element 100 comprises at least one contour element 102 which is configured for receiving a counter contour element 212, arranged at the connection element 200 of the separation device 300, when screwing the separation element 100 onto the connection element 200 as intended. In particular, the separation element 100 can comprise a contour 104 at the contour element 102 which can be assembled confusion-proof with the counter contour element 212 (see FIG. 5).

When mounting the separation element 100 as intended on the connection element 200, the counter contour element 212 can extend through the contour element 102 at least in sections.

In a preferred embodiment, the extension opening 60 can be advantageously delimited by a radially inner rim region 62 of the first end disk 50 in relation to the intended mounting axis 40 of the separation element 100. The contour element 102 in this context can be configured as a radially inner, in particular circular, rim region 62 of the extension opening 60. The circumferential element 204 of the connection element 200 can comprise the counter contour element 212. In this context, an outer diameter of the counter contour element 212 can be smaller than an inner diameter of the contour element 102.

In an alternative embodiment, the contour element 102 can comprise at least one contour 104, in particular cutouts 106, cuts and/or holes, which upon intended mounting interacts, in particular interlocks, with a counter contour 214 arranged at the counter contour element 212.

Advantageously, at least one of contour element 102 and counter contour element 212 is supported so as to be rotatable about the mounting axis 40 so that contour element 102 and counter contour element 212 can engage each other when the separation element 100 is screwed onto the connection element 200.

Furthermore, at least one receptacle 68 for a sealing and damping element 80 can be provided which is seal-tightly compressed between the filter element 10, in particular between the first end disk 50, and a seal surface 42 configured at an inner side 38 of the housing cover 30 facing the interior 24 of the housing 90.

The sealing and damping element 80 is configured to seal a clean side 112 of the separation element 100 from a raw side 110 of the housing 90 holding unpurified gas as well as to dampen axially oriented vibrations of the filter element 10 in relation to the intended mounting axis 40 of the separation element 100.

Figure 11:
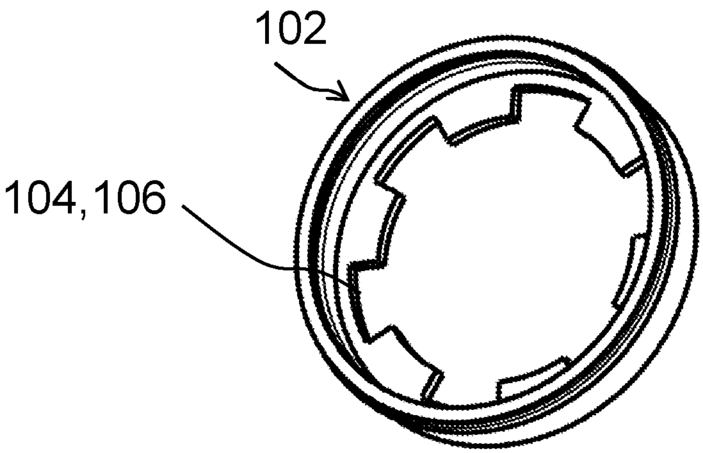
FIG. 11 shows a contour element in a perspective view.
Figure 12:
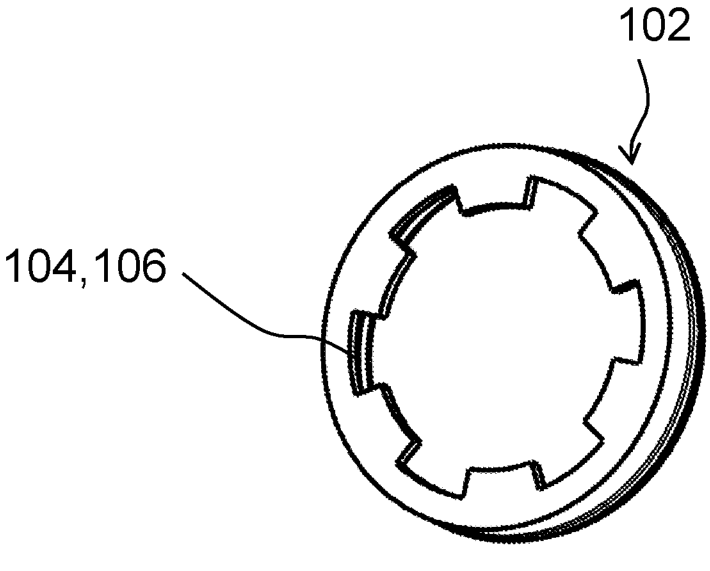
FIG. 12 shows the contour element of FIG. 11 in a view from the opposite viewing direction.

FIGS. 11 and 12 show an embodiment of a contour element 102 in axially opposed perspectives with the contour 104 designed as a plurality of cutouts 106. The contour element 102 at the separation element 100 interacts with a complementary counter contour element 212 at the connection element 200 (compare FIG. 4) which is configured for confusion-proof interaction upon intended screwing of the separation element 100 onto the connection element 200.

The invention claimed is:

1. A separation device for separating at least one liquid fluid from a gas, the separation device comprising:

at least one separation element comprising a housing, a housing cover arranged at the housing, and a filter element arranged inside the housing, wherein the housing cover comprises a housing cover thread;

at least one first gas passage arranged centrally in relation to a mounting axis of the at least one separation element for mounting at a connector device, wherein the housing cover thread is assigned to the at least one first gas passage;

at least one second gas passage arranged radially outside of the at least one first gas passage in relation to the mounting axis of the at least one separation element;

at least one connection element configured to connect the at least one separation element to the connector device, wherein the at least one connection element comprises a connection element thread and further comprises a conduit, wherein the housing cover thread is configured for screwing onto the connection element thread;

wherein the at least one connection element further comprises a circumferential element adjoining the connection element thread, wherein the circumferential element extends in an axial direction of the at least one connection element into an interior of the at least one separation element;

wherein the connection element thread and the circumferential element surround the conduit;

wherein at least one fluid channel extending in the axial direction of the at least one connection element is disposed between the conduit and the circumferential element;

wherein the at least one separation element comprises at least one contour element and the at least one connection element comprises at least one complementary counter contour element complementary to the at least one contour element of the at least one separation element;

wherein the at least one contour element and the at least one complementary counter contour element are configured for confusion-proof interaction with each other upon intended screwing of the at least one separation element onto the at least one connection element; and wherein the at least one complementary counter contour element is arranged at the circumferential element and comprises one or more passages, wherein the one or more passages penetrate the circumferential element in a radial direction of the at least one connection element from an outer side of the circumferential element up to the at least one fluid channel.

2. The separation device according to claim 1, wherein the filter element comprises an end disk, wherein the end disk comprises a radially inner rim region surrounding an extension opening, wherein the radially inner rim region is the at least one contour element, wherein the at least one complementary counter contour element extends through the at least one contour element upon intended mounting of the at least one separation element on the at least one connection element.

3. The separation device according to claim 2, wherein an outer diameter of the at least one complementary counter contour element is smaller than an inner diameter of the at least one contour element.

4. The separation device according to claim 1, wherein the at least one contour element comprises at least one contour and the at least one complementary counter contour element comprises at least one counter contour, wherein, upon intended mounting of the at least one separation element on the at least one connection element, the at least one contour of the at least one contour element interacts or interlocks with the at least one counter contour of the at least one complementary counter contour element.

5. The separation device according to claim 4, wherein the at least one contour of the at least one contour element is selected from the group consisting of cutouts, cuts, and holes, and combinations thereof.

6. The separation device according to claim 1, wherein the one or more passages are arranged inside of at least one counter contour of the at least one complementary counter contour element in a circumferential direction of the at least one connection element.

7. The separation device according to claim 1, wherein the at least one contour element and/or the at least one counter contour element is supported rotatably about the mounting axis of the at least one separation element.

8. The separation device according to claim 1, further comprising at least one sealing and damping element seal-tightly compressed between the filter element and a seal surface at an inner side of the housing cover, wherein the inner side of the housing cover faces an interior of the housing, wherein the at least one sealing and damping element seals a clean side of the at least one separation element from a raw side of the housing holding unpurified gas and dampens axially oriented vibrations of the filter element in relation to the mounting axis of the at least one separation element.

9. The separation device according to claim 1, wherein the filter element comprises an end disk, wherein the end disk comprises a radially inner rim region surrounding an extension opening, wherein the at least one connection element and the end disk are contactless in a position of use of the separation device such that the housing cover thread and an interior of the filter element are in throttled fluid communication.

10. The separation device according to claim 9, wherein the at least one connection element and the extension opening of the end disk are contactless in the position of use of the separation device.

11. The separation device according to claim 10, wherein the at least one connection element and the radially inner rim region are contactless in the position of use of the separation device.

12. A separation element for a separation device, the separation element comprising:

a housing;

a housing cover configured to close an end face of the housing;

at least one filter element arranged inside the housing;

at least one first gas passage arranged centrally in relation to an intended mounting axis of the separation element for mounting at a connector device;

a housing cover thread assigned to the at least one first gas passage and configured for screwing onto a connection element thread of a connection element of the separation device, wherein the connection element comprises a circumferential element adjoining the connection element thread, wherein the circumferential element extends in an axial direction of the connection element into an interior of the separation element;

at least one second gas passage arranged radially outside of the at least one first gas passage in relation to the intended mounting axis of the separation element;

wherein the at least one filter element comprises an end face, wherein the end face, in relation to the intended mounting axis of the separation element, extends radially and faces the housing cover and is delimited by an end disk;

wherein the end disk comprises an extension opening assigned to the at least one first gas passage and configured for passing the connection element therethrough;

at least one contour element configured for receiving a counter contour element of the connection element upon intended screwing of the separation element onto the connection element, wherein the at least one contour element comprises at least one contour configured to be assembled confusion-proof with the counter contour element of the connection element; and wherein the at least one counter contour element is arranged at the circumferential element and comprises one or more passages, wherein the one or more passages penetrate the circumferential element in a radial direction of the connection element.

13. The separation element according to claim 12, wherein the counter contour element of the connection element at least in sections passes through the at least one contour element upon intended mounting of the separation element on the connection element.

14. The separation element according to claim 12, wherein the extension opening is delimited by a radially inner rim region of the end disk in relation to the intended mounting axis of the separation element, wherein the radially inner rim region is the at least one contour element, wherein an outer diameter of the counter contour element is smaller than an inner diameter of the at least one contour element.

15. The separation element according to claim 12, wherein the at least one contour element comprises at least one contour.

16. The separation element according to claim 15, wherein the at least one contour is selected from the group consisting of cutouts, cuts, and holes, and combinations thereof.

17. The separation element according to claim 12, wherein the at least one contour element is rotatably supported about the intended mounting axis of the separation element.

18. The separation element according to claim 12, further comprising at least one receptacle and a sealing and damping element arranged in the at least one receptacle, wherein the sealing and damping element is seal-tightly compressed between the at least one filter element and a seal surface formed at an inner side of the housing cover, wherein the inner side of the housing cover faces an interior of the housing, wherein the sealing and damping element is configured to seal a clean side of the separation element from a raw side of the housing holding unpurified gas and is further configured to dampen axially oriented vibrations of the at least one filter element in relation to the intended mounting axis of the separation element.

19. The separation element according to claim 18, wherein the sealing and damping element is seal-tightly compressed between the end disk of the at least one filter element and the seal surface formed at the inner side of the housing cover.

* * * * *